(12) United States Patent
Jeanne et al.

(10) Patent No.: US 11,039,907 B2
(45) Date of Patent: Jun. 22, 2021

(54) METHODS AND SYSTEMS FOR PROVIDING BRUSHING SESSION FEEDBACK

(71) Applicant: KONINKLIJKE PHILIPS N.V., Eindhoven (NL)

(72) Inventors: Vincent Jeanne, Migne Auxances (FR); Yekaterina Borisenko, Lynnwood, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 446 days.

(21) Appl. No.: 16/065,915

(22) PCT Filed: Dec. 16, 2016

(86) PCT No.: PCT/IB2016/057698
§ 371 (c)(1),
(2) Date: Jun. 25, 2018

(87) PCT Pub. No.: WO2017/115200
PCT Pub. Date: Jul. 6, 2017

(65) Prior Publication Data
US 2019/0008619 A1   Jan. 10, 2019

Related U.S. Application Data

(60) Provisional application No. 62/272,215, filed on Dec. 29, 2015.

(51) Int. Cl.
*A61C 17/00* (2006.01)
*A61C 17/22* (2006.01)
(Continued)

(52) U.S. Cl.
CPC ............ *A61C 17/221* (2013.01); *A46B 9/045* (2013.01); *A46B 15/0006* (2013.01);
(Continued)

(58) Field of Classification Search
CPC ..... A61C 17/221; A61C 1/0015; A46B 9/045; A46B 15/0006; G09B 5/02; G09B 5/04; G09B 19/0084
(Continued)

(56) References Cited

U.S. PATENT DOCUMENTS

2008/0141478 A1\*  6/2008  Gatzemeyer ....... A46B 15/0004
                                                                15/167.1
2009/0092955 A1    4/2009  Hwang
(Continued)

FOREIGN PATENT DOCUMENTS

GB      2519579 A     4/2015
WO   2009107047 A1    9/2009
(Continued)

*Primary Examiner* — Robert P Bullington

(57) ABSTRACT

A method (300) for providing feedback to a user of an oral cleaning device (10). The method includes the steps of: (i) receiving (330), from a sensor (28) of the oral cleaning device, data about a plurality of orientations of the oral cleaning device within the user's mouth during a cleaning session; (ii) extracting (340), from the received data, information about one or more stable orientations of the oral cleaning device within the user's mouth during the cleaning session, where a stable orientation is an orientation of the oral cleaning device maintained by the user for a period of time above a threshold; (iii) fitting (350) the information about the one or more stable orientations of the oral cleaning device to one or more expected orientations; and (iv) providing (360) feedback to the user about the cleaning session based on an analysis of the fitted one or more stable orientations.

14 Claims, 6 Drawing Sheets

(51) Int. Cl.
  *A46B 15/00*    (2006.01)
  *A46B 9/04*    (2006.01)
  *A61C 1/00*    (2006.01)
  *G09B 5/02*    (2006.01)
  *G09B 5/04*    (2006.01)
  *G09B 19/00*    (2006.01)

(52) U.S. Cl.
  CPC .............. *A61C 1/0015* (2013.01); *G09B 5/02* (2013.01); *G09B 5/04* (2013.01); *G09B 19/0084* (2013.01); *A46B 2200/108* (2013.01); *A46B 2200/1066* (2013.01)

(58) Field of Classification Search
  USPC ........................................................ 434/263
  See application file for complete search history.

(56) References Cited

U.S. PATENT DOCUMENTS

| | | |
|---|---|---|
| 2009/0317770 A1 | 12/2009 | Gatzemeyer et al. |
| 2012/0171657 A1 | 7/2012 | Ortins et al. |
| 2013/0074616 A1 | 3/2013 | Puurunen |
| 2013/0166220 A1 | 6/2013 | Bates et al. |
| 2015/0044629 A1* | 2/2015 | Wang ................. A46B 15/0006 433/27 |

FOREIGN PATENT DOCUMENTS

| | | |
|---|---|---|
| WO | 2014036423 A1 | 3/2014 |
| WO | 2015059443 A1 | 4/2015 |
| WO | 2017109633 A1 | 6/2017 |

* cited by examiner

METHODS AND SYSTEMS FOR PROVIDING BRUSHING SESSION FEEDBACK

CROSS-REFERENCE TO PRIOR APPLICATIONS

This application is the U.S. National Phase application under 35 U.S.C. § 371 of International Application No. PCT/IB2016/057698, filed on Dec. 16, 2016, which claims the benefit of U.S. Provisional Patent Application No. 62/272,215, filed on Dec. 29, 2015. These applications are hereby incorporated by reference herein.

FIELD OF THE INVENTION

The present disclosure is directed generally to methods and systems for providing feedback to a user about a cleaning session based on an analysis of sensor input.

BACKGROUND

Proper tooth brushing technique, including length and coverage of brushing, helps ensure long-term dental health. Many dental problems are experienced by individuals who either do not regularly brush their teeth or who do so inadequately. Among individuals who do regularly brush, improper brushing habits can result in poor coverage of brushing and thus surfaces that are not adequately cleaned.

To facilitate proper brushing technique, it is important to ensure that there is adequate cleaning of all dental surfaces, including areas of the mouth that are hard to reach or that tend to be improperly cleaned during an average brushing session. One way to ensure adequate coverage is to track the position of the toothbrush in the mouth during a brushing session and compare that to a map of the dental surfaces. For example, a system with sensors positioned in fixed relationship to the teeth of the user could track the movement of a toothbrush over the user's teeth. Alternatively, the toothbrush could include one or more internal sensors that attempt to track movement of the device within the mouth. In such a system, the user starts with the toothbrush at a known, fixed position within the mouth and subsequent movement of the brush is determined from the one or more internal sensors. Systems utilizing, for example, electromagnetic reference devices and MEMS-based sensors have been developed but are currently unable to provide adequate tracking and feedback.

However, this approach has several limitations. Users are unable to move their head during brushing as this interferes with the proper positioning of the original fixed reference spot. The system may be unable to distinguish between certain regions of the mouth where data are similar, such as the upper left inside of the mouth and the upper right outside of the mouth. The resolution of the system is low, meaning that only broad sections of the mouth can be tracked rather than more exact positioning such as teeth. Indeed, the detection of teeth sub-segments remains challenging as these systems are not easily applied to a large population with significant oral variation, and statistical modelling is inadequate as a user's brushing habits can change over time.

Accordingly, there is a continued need in the art for a method for providing feedback to a user based on an analysis of spatial sensor input obtained during a guided brushing session.

SUMMARY OF THE INVENTION

The present disclosure is directed to inventive methods and systems for providing feedback about a brushing session to a user of an oral cleaning device. Applied to a system configured to provide a guided brushing session, the inventive methods and systems enable more detailed and accurate identification of tooth sub-segment brushing and thus allow for an improved evaluation of a user's brushing technique. Using sensor data, the method extracts information about stable orientations of the oral cleaning device within the user's mouth during the cleaning session, fits the stable orientations to expected orientations, and determines coverage of tooth sub-segments in order to provide feedback to the user.

Generally in one aspect, a method for providing feedback to a user of an oral cleaning device is provided. The method includes the steps of: (i) receiving, from a sensor, data about a plurality of orientations of the oral cleaning device within the user's mouth during a cleaning session; (ii) extracting, from the received data, information about one or more stable orientations of the oral cleaning device within the user's mouth during the cleaning session, where a stable orientation is an orientation of the oral cleaning device maintained by the user for a period of time above a threshold; (iii) fitting the information about the one or more stable orientations of the oral cleaning device to one or more expected orientations; and (iv) providing feedback to the user about the cleaning session based on an analysis of the fitted one or more stable orientations.

According to an embodiment, the step of fitting each of the one or more stable orientations of the oral cleaning device to an expected orientation includes the steps of: clustering the one or more stable orientations of the oral cleaning device by identifying a mixture distribution; and comparing the clusters to one or more expected orientations.

According to an embodiment, the step of clustering the one or more stable orientations comprises a multivariate Gaussian mixture model.

According to an embodiment, the threshold is a predetermined threshold or is statistically derived.

According to an embodiment, the feedback comprises information about an amount of time the user spent cleaning each of one or more of a plurality of surfaces within the user's mouth.

According to an embodiment, the method also includes the step of directing the user to begin the cleaning session with the oral cleaning device at a specific location within the user's mouth.

According to an embodiment, the cleaning session is a guided cleaning session.

According to an embodiment, the one or more expected orientations are at least an inner tooth surface and an outer tooth surface for each of a plurality of locations within the mouth.

According to an aspect, an oral cleaning device configured to provide feedback to a user is provided. The oral cleaning device includes: a sensor, a feedback component, and a controller in communication with the sensor and the feedback component. The controller is configured to: receive, from the sensor, data about a plurality of orientations of the oral cleaning device within the user's mouth during a cleaning session; extract, from the received data, information about one or more stable orientations of the oral cleaning device within the user's mouth during the cleaning session; fit the information about the one or more stable orientations of the oral cleaning device to one or more expected orientations; and provide, via the feedback component, feedback to the user about the cleaning session based on an analysis of the fitted one or more stable orientations.

According to an embodiment, the sensor is one or more of a gyroscope, an accelerometer, and a magnetometer.

According to an aspect, an oral cleaning system configured to provide feedback to a user is provided. The system includes: (i) an oral cleaning device including a sensor and a communications module, where the oral cleaning device is configured to transmit, via the communications module, sensor data from the sensor about orientations of the oral cleaning device within the user's mouth during a cleaning session; and (ii) a device in communication with the oral cleaning device and including a processor, where the processor is configured to: extract, from the received sensor data, information about one or more stable orientations of the oral cleaning device within the user's mouth during the cleaning session; fit the information about the one or more stable orientations of the oral cleaning device to one or more expected orientations; and provide, via a feedback component, feedback to the user about the cleaning session based on an analysis of the fitted one or more stable orientations.

According to an embodiment, the feedback comprises information about cleaning efficacy for one or more of a plurality of locations within the user's mouth.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and controller for providing feedback about a brushing session to a user of an oral cleaning device. More generally, Applicant has recognized and appreciated that it would be beneficial to provide a system to detect the movement of an oral cleaning device within the mouth during a guided brushing session in order to provide an evaluation of the user's brushing technique. Accordingly, the methods described or otherwise envisioned herein provide an oral cleaning device configured to receive sensor data about a plurality of orientations of the oral cleaning device within the user's mouth during a guided cleaning session, and use that data to provide feedback. According to an embodiment, information about stable orientations of the oral cleaning device within the user's mouth is extracted from the sensor data, and is fit to expected orientations. The system uses this information to determine the user's coverage of tooth sub-segments during the guided cleaning session, and can provide feedback to the user about that coverage.

A particular goal of utilization of the embodiments and implementations herein is to provide brushing information using an oral cleaning device such as, e.g., a Philips Sonicare™ toothbrush (manufactured by Koninklijke Philips Electronics, N.V.), although the embodiments described or otherwise envisioned herein may be utilized with any appropriate device.

Figure 1:
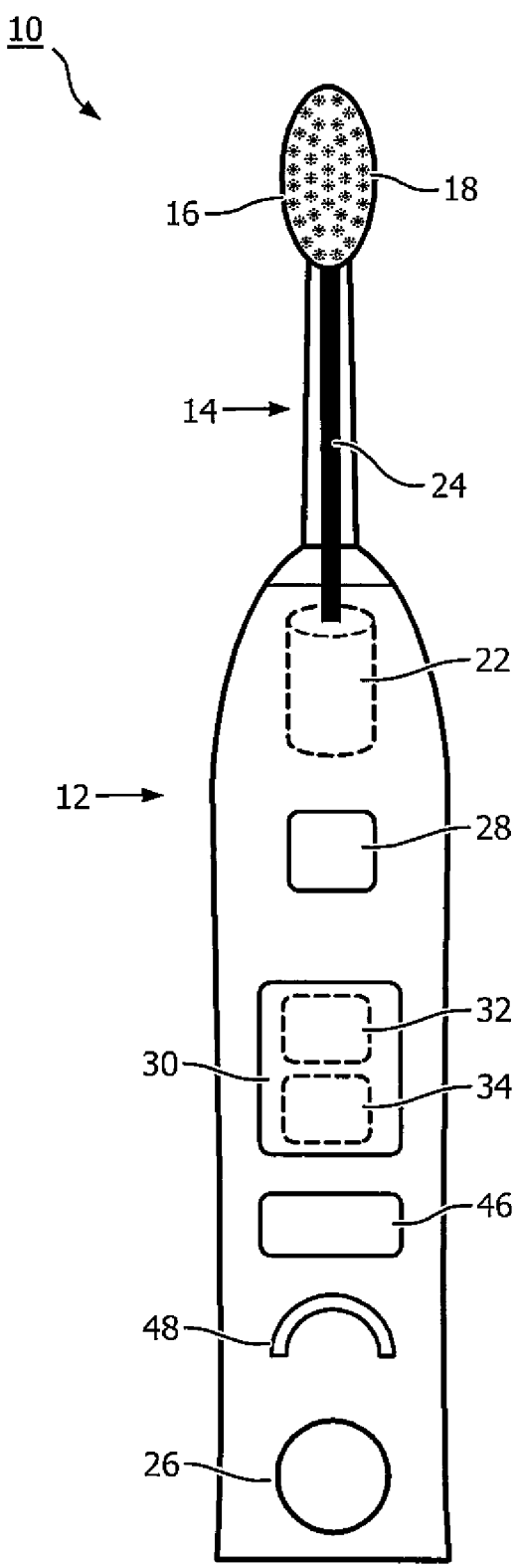
FIG. 1 is a representation of an oral cleaning device in accordance with an embodiment.

Referring to FIG. 1, in one embodiment, an oral cleaning device 10 is provided that includes a body portion 12 and a brush head member 14 mounted on the body portion. Brush head member 14 includes at its end remote from the body portion a brush head 16. Brush head 16 includes a bristle face 18, which provides a plurality of bristles. According to an embodiment, the bristles extend along an axis substantially perpendicular to the head's axis of elongation, although many other embodiments of the brush head and bristles are possible.

According to one possible embodiment, head member 14, brush head 16, and/or bristle face 18 are mounted so as to be able to move relative to the body portion 12. The movement can be any of a variety of different movements, including vibrations or rotation, among others. According to an embodiment, head member 14 is mounted to the body so as to be able to vibrate relative to body portion 12. For example, in accordance with an embodiment, the bristles in bristle face 18 are vibrated at a frequency that is equal to or greater than approximately 250 Hz, but many other frequencies, patterns, and vibrations are possible. The head member 14 can be fixedly mounted onto body portion 12, or it may alternatively be detachably mounted so that head member 14 can be replaced with a new one when the bristles or another component of the device are worn out and require replacement.

According to an embodiment, body portion 12 includes a drivetrain 22 for generating movement and a transmission component 24 for transmitting the generated movements to brush head member 14. For example, drivetrain 22 can comprise a motor or electromagnet(s) that generates movement of the transmission component 24, which is subsequently transmitted to the brush head member 14. Drivetrain 22 can include components such as a power supply, an oscillator, and one or more electromagnets, among other components. In this embodiment the power supply comprises one or more rechargeable batteries, not shown, which can, for example, be electrically charged in a charging holder in which oral cleaning device 10 is placed when not in use.

Although in the present embodiment the oral cleaning device 10 is an electric toothbrush, it will be understood that in an alternative embodiment the oral cleaning device is a manual toothbrush (not shown). In such an arrangement, the manual toothbrush has electrical components, but the brush head is not mechanically actuated by an electrical component.

Body portion 12 is further provided with a user input 26 to activate and de-activate movement generator 22. The user input 26 allows a user to operate the oral cleaning device 10, for example to turn the oral cleaning device 10 on and off. The user input 26 may, for example, be a button, touch screen, or switch.

The oral cleaning device 10 includes one or more sensors 28. Sensor 28 is shown in FIG. 1 within body portion 12, but may be located anywhere within the device, including for example within brush head member 14 or brush head 16. The sensors 28 can comprise, for example, a 6-axis or a 9-axis spatial sensor system. For example, the sensor 28 is configured to provide the readings of six axes of relative motion (three axes translation and three axes rotation), using for example a 3-axis gyroscope and a 3-axis accelerometer. As another example, the sensor 28 is configured to provide the readings of nine axes of relative motion using, for example, 3-axis gyroscope, a 3-axis accelerometer, and a 3-axis magnetometer. Other sensors may be utilized either alone or in conjunction with these sensors, including but not limited to a pressure sensor and other types of sensors, such as a capacitive sensor, a camera, a photocell, and other types of sensors. Many different types of sensors could be utilized, as described or otherwise envisioned herein.

The sensor 28 is disposed in a predefined position and orientation in the oral cleaning device 10. Therefore, the orientation and position of the brush head can be easily determined based on the known orientation and position of the sensor 28. Accordingly, the brush head is in a fixed spatial relative arrangement to sensor 28.

The sensor 28 is configured to generate information indicative of the acceleration and angular orientation of the oral cleaning device 10. The sensor system may comprise two or more sensors 28 that function together as the 6-axis or a 9-axis spatial sensor system. According to another embodiment, an integrated 9-axis spatial sensor can provide space savings in an oral cleaning device 10.

The information generated by the first sensor 28 is provided to a device controller 30. Controller 30 can comprise a processor 32 and a memory 34. The processor 32 may take any suitable form. For instance, processor 32 may be or include a microcontroller, plural microcontrollers, circuitry, a single processor, or plural processors. Controller 30 may be formed of one or multiple modules, and is operable to operate the oral cleaning device 10 in response to an input, for example user input 26. For example, controller 30 can be configured to actuate a motor control unit. According to an embodiment, the sensor 28 is integral to the controller 30.

The memory 34 can take any suitable form, including a non-volatile memory and/or RAM. The non-volatile memory may include read only memory (ROM), a hard disk drive (HDD) or a solid state drive (SSD). The memory can store, among other things, an operating system. The RAM is used by the processor for the temporary storage of data. The operating system may contain code which, when executed by controller 30, controls operation of each of the hardware components of the oral cleaning device 10.

According to an embodiment, the oral cleaning system includes a guided brushing component 46 configured to provide instructions to the user during the brushing session. The guided brushing component 46 can take various forms, but will provide instructions to the user that can be read, viewed, heard, or otherwise interpreted concerning where and when to brush particular sections, segments, or areas of the interior of the mouth, including the surfaces of teeth, the tongue, and other surfaces. For example, guided brushing component 46 can be a component of oral cleaning device 10, or the guided brushing component can be a component of a separate device. According to an embodiment, guided brushing component 46 is a graphical display that informs the user about which surfaces to brush. For example, the guided brushing component 46 can be a game, a map of the mouth, or other graphical display. According to another embodiment, guided brushing component 46 provides audible instructions to a user. According to yet another embodiment, guided brushing component 46 provides haptic or other instructions to the user.

Figure 2A:
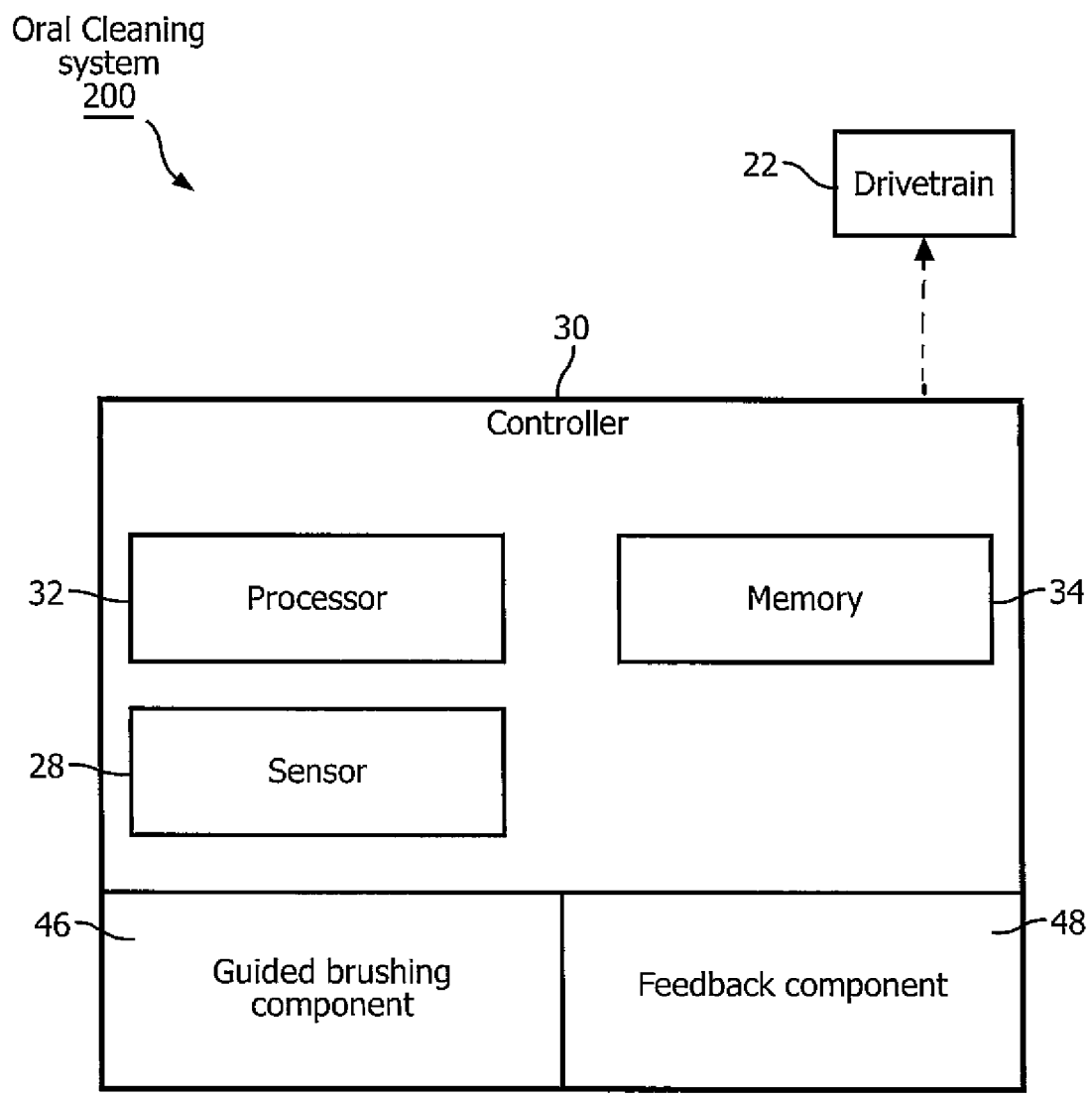
FIG. 2A is a schematic representation of an oral cleaning device control system in accordance with an embodiment.

Referring to FIG. 2A, an embodiment of an oral cleaning system 200 is provided. According to an embodiment, oral cleaning system 200 includes one or more sensors 28 and a controller 30 comprising a processor 32 and a memory 34. When utilized with electric cleaning devices, the oral cleaning system 200 includes a drivetrain 22, the operation of which is controlled by controller 30. The oral cleaning system also includes a feedback component 48 and a guided brushing component 46. According to an embodiment, the controller 30 and/or guided brushing component 46 provides guided brushing instructions to the user during the brushing session. The controller 30 also receives data from sensor 28 about a plurality of orientations of the oral cleaning device within the user's mouth during a cleaning session. As the user brushes surfaces within the mouth, movement and/or orientation information is generated by sensor 28 and sent to controller 30. The controller or other component of the system extracts information about one or more stable orientations of the oral cleaning device within the user's mouth from the obtained movement and/or orientation information, and fits that extracted information to one or more expected orientations. The controller 30 and feedback component 48 can then provide feedback to the user about the cleaning session based on an analysis of the fitted one or more stable orientations.

Figure 2B:
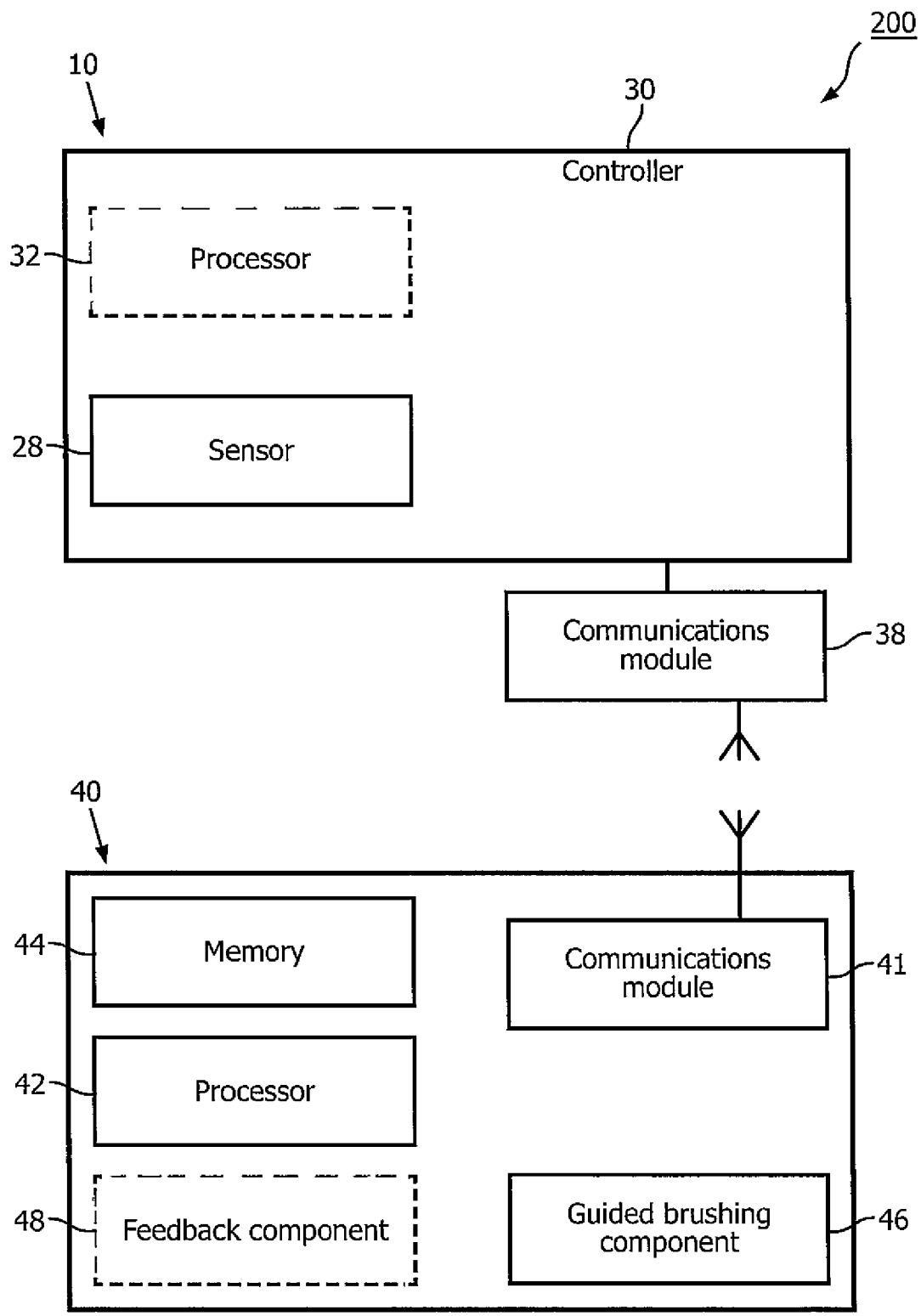
FIG. 2B is a schematic representation of an oral cleaning device control system in accordance with an embodiment.

Referring to FIG. 2B is another embodiment of an oral cleaning system 200 comprising an oral cleaning device 10 and a remote device 40 which is separate from the oral cleaning device. The oral cleaning device 10 can be any of the oral cleaning device embodiments disclosed or otherwise envisioned herein. According to an embodiment, oral cleaning device 10 includes one or more sensors 28, and a controller 30 comprising a processor 32. When utilized with electric cleaning devices, the oral cleaning device 10 includes a drivetrain 22, the operation of which is controlled by controller 30. According to an embodiment, oral cleaning device 10 comprises a communications module 38 that transmits collected spatial sensor information. The communications module can be any module, device, or means capable of transmitting a wired or wireless signal, including but not limited to a Wi-Fi, Bluetooth, near field communication, and/or cellular module.

According to an embodiment, remote device 40 can be any device configured to or capable of receiving and processing the spatial sensor information transmitted from oral cleaning device 10. For example, remote device 40 may be a cleaning device holder or station, a smartphone, a computer, a server, or any other computerized device. According to an embodiment, device 40 includes a communications module 41 which can be any module, device, or means capable of receiving a wired or wireless signal, including but not limited to a Wi-Fi, Bluetooth, near field communication, and/or cellular module. Device 40 also includes a processor 42 which uses the received spatial sensor information from sensor 28 to determine movement and/or orientation of oral cleaning device 10 as the user moves the device throughout the mouth, as described herein. According to an embodiment, device 40 may include memory 44 to store received spatial sensor information, or any other information. Further, device 40 may include a feedback component 48 and a guided brushing component 46. According to an embodiment, the processor and/or guided brushing component 46 provides guided brushing instructions to the user during the brushing session, and the feedback component 48 provides feedback information to the user.

As just one example, oral cleaning device 10 can collect sensor information using sensor 28 and transmit that information locally via a Bluetooth connection to a smartphone device 40, where the sensor information is processed and/or stored. As another example, oral cleaning device 10 can collect sensor information using sensor 28 and transmit that information via a WiFi connection to the Internet where it is communicated to a remote server device 40. The remote server device 40 processes and/or stores the sensor information. A user may access that information directly or may receive reports, updates, or other information from the remote server device 40 or an associated device.

Figure 3:
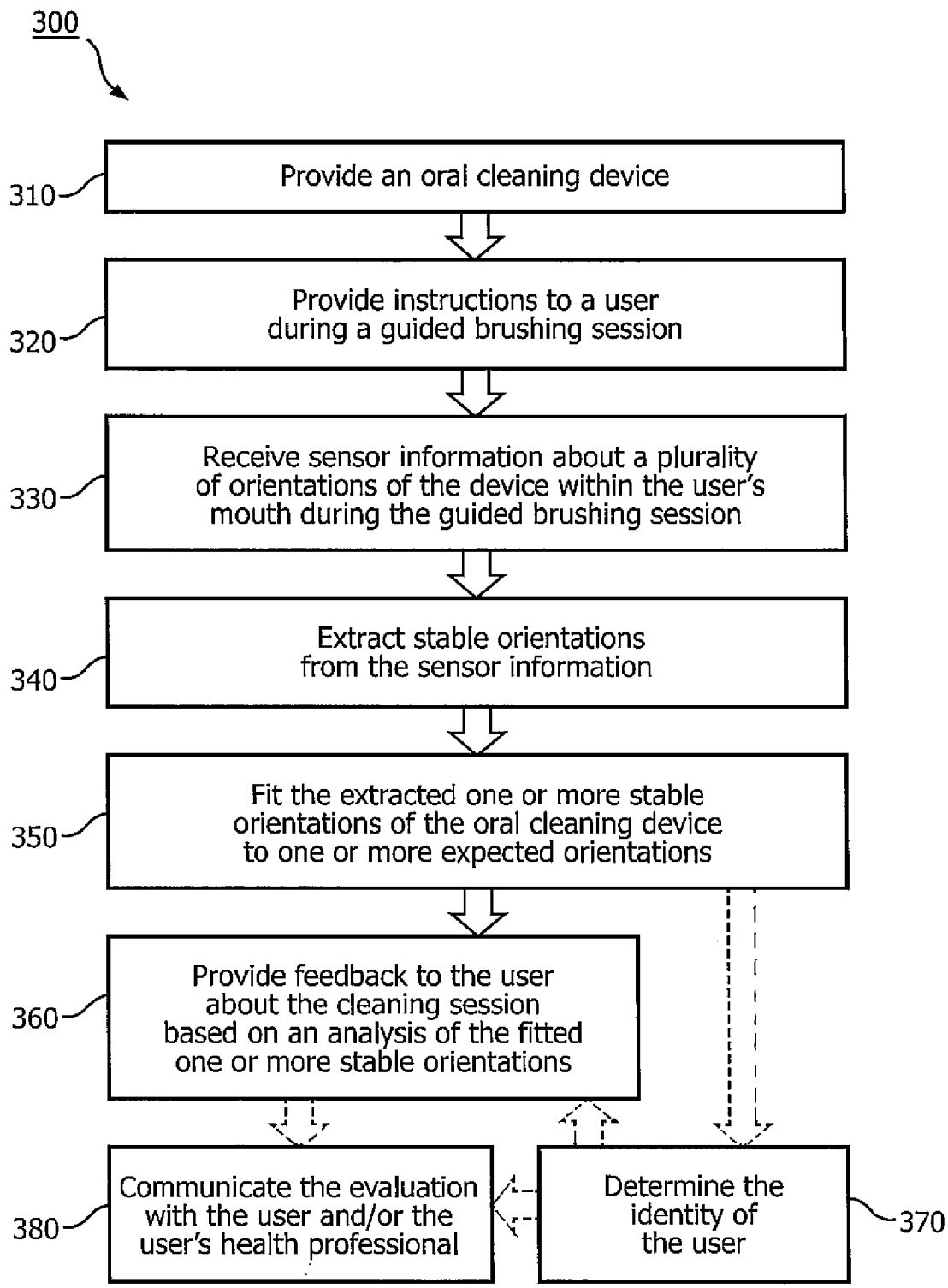
FIG. 3 is a flowchart depicting a method for providing feedback about a brushing session to a user of an oral cleaning device in accordance with an embodiment.

Referring to FIG. 3, in one embodiment, is a flowchart of a method 300 for providing feedback to a user about a cleaning session. At step 310 of the method, an oral cleaning device 10 is provided. The oral cleaning device can be any of the embodiments described or otherwise envisioned herein. For example, according to one embodiment, oral cleaning device 10 includes a body portion 12, a brush head member 14 with a bristle face 18, a sensor 28, and a controller 30 with processor 32 and memory 34. The oral cleaning device 10 may also include a feedback component 48 and a guided brushing component 46.

At step 320 of the method, the guided brushing component 46 and/or controller provides guided brushing instructions to the user during the brushing session. For example, the guided brushing component 46 can include or communicate with a display or speaker that provides visual, audible, and/or written instructions to the user. As an initial step, the system directs the user to begin the cleaning or brushing session with the oral cleaning device 10 at a specific location within the user's mouth, such as the upper left outer surface, bottom right outer surface, or any of a plurality of other surfaces or locations. Once the user has brushed the initial surface for a sufficient and/or predetermined amount of time, the system directs the user to switch to a different location with the user's mouth. The instructions can continue for a predetermined routine or amount of time in order to ensure adequate cleaning of all surfaces. For example, many dentists and other oral care professionals recommend brushing for 2-3 minutes, with equal time on the top teeth and bottom teeth.

At step 330 of the method, during a brushing session the sensor(s) detects movement and/or orientation of the oral cleaning device 10, and the controller receives the sensor information from the sensor. The sensor information includes data about a plurality of different orientations of the device within the user's mouth during the guided brushing session. According to an embodiment, the sensor information can include data from an accelerometer, gyroscope, and/or magnetometer included in an inertial measurement unit embedded in the toothbrush. Methods for the computation of the orientation of an oral cleaning device based on the received sensor data is known in the art, and can include, for example, orientation filters such as Kalman filters, particle filters, complementary filters, and other mechanisms. The sensor information can be analyzed immediately in other steps of the method, or can be stored in memory for later analysis. For example, the sensor information can be stored during the brushing session and can be analyzed after completion of the brushing session.

At step 340 of the method the system extracts, from the orientation data, information about one or more stable orientations of the oral cleaning device within the user's mouth during the cleaning session. This can occur during brushing, after brushing, or both during and after a brushing session. According to an embodiment, a stable orientation is an orientation of the oral cleaning device maintained by the user for a period of time above a certain threshold which can be predetermined or derived.

If a user were to adhere to a significant degree to the guided brushing instructions, it would be expected that there would be relatively few distinguishable orientations for any given surface, tooth, or sub-segment. For example, an ideal orientation when brushing the upper left part of the jaw might consists of −45 degrees for the outer teeth surface, 0 degrees for the chewing surface, and 45 degrees for the inner teeth surface. However, in real-life applications the oral cleaning device is constantly moving and almost any orientation may be observed by the system.

Accordingly, if a user brushes a surface at a consistent angle for at least a period of time, the system can analyze the orientation data to identify stable orientations and reject noisy orientations, where a stable orientation is a consistent orientation of the oral cleaning device maintained by the user for a period of time, and a noisy orientation is an inconsistent or temporary orientation of the oral cleaning device. For example, noisy orientations will be observed when the user is moving the oral cleaning device from one area of the mouth to another area of the mouth, or switching rapidly between different surfaces of the mouth without brushing consistently in a single region, area, or surface. In contrast, stable orientations will be observed when the user is consistently brushing a surface of the mouth.

Figure 4:
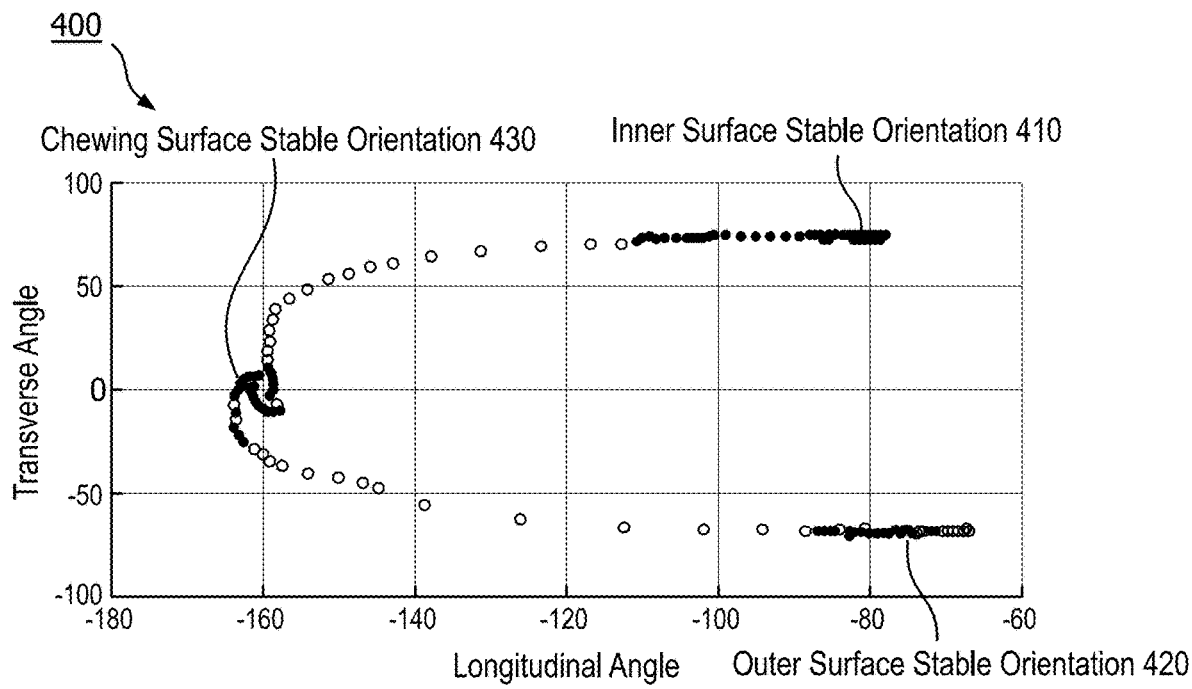
FIG. 4 is a graph depicting a plurality of orientations obtained during a brushing session in accordance with an embodiment.

Referring to FIG. 4, in one embodiment, is a graph 400 of a plurality of orientations obtained during a brushing session, representing angles along the longitudinal and transversal axes of the oral cleaning device. The system rejects noisy orientations, or high angular acceleration data, and identifies three stable orientations representing the inner surface stable orientation 410, outer surface stable orientation 420, and chewing surface stable orientation 430, all brushed by the user in that guided segment of the mouth.

The rejection of noisy orientations and/or identification of stable orientations can be performed automatically by the system using one of many different mechanisms. For example, the system can comprise a threshold that could, for example, be based on heuristic information or models, statistically derived, or set by a user or manufacturer. As another example, the system can comprise or perform statistical analysis of the angular acceleration using a histogram where the optimal boundary between regular angular acceleration and high speed acceleration is determined by, for example, Multivariate Gaussian mixture modelling. As yet another example, the system can comprise or utilize a hybrid approach where heuristic thresholds are used as a starting point for the statistical analysis. The automated system or algorithm identifies one or more stable orientations of the oral cleaning device that will, in a later step, correspond to surfaces cleaned by the user during the guided brushing session.

Therefore, according to an embodiment, the system fits one or more of the identified stable orientations to one or more expected orientations by first clustering the one or more stable orientations of the oral cleaning device by identifying a mixture distribution, and then comparing the clusters to one or more expected orientations.

Figure 5:
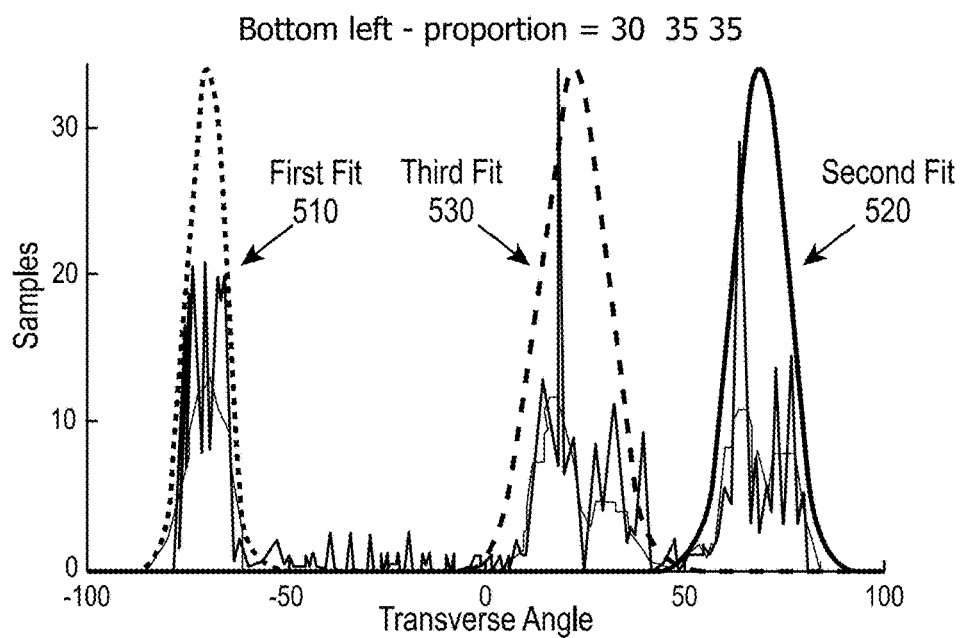
FIG. 5 is a graph of the output of mixture modelling utilized to fit normal distributions to identified stable orientations of an oral cleaning device, in accordance with an embodiment.

At step 350 of the method, the system fits or attempts to fit the extracted or identified one or more stable orientations of the oral cleaning device to one or more expected orientations. For example, according to an embodiment the information from step 340 of the method is analyzed by Multivariate Gaussian mixture modelling to fit the identified one or more stable orientations to expected orientations. Referring to FIG. 5, in one embodiment, is a graph 500 of the output of Multivariate Gaussian mixture modelling to fit three normal distributions, or Gaussians, to the identified three stable orientations of the oral cleaning device, where each Gaussian is expected to represent a teeth surface: inner, outer, or chewing. For the graph depicted in FIG. 5, the input data characterizes orientation along the longitudinal axis of the oral cleaning device while brushing was occurring in the lower left portion of the user's mouth. After performing the Multivariate Gaussian mixture modelling of the identified one or more stable orientations, a first Gaussian fit 510, second Gaussian fit 520, and third Gaussian fit 530 are identified and can be characterized as brushing of an inner surface (Gaussian fit 510), a chewing surface (Gaussian fit 530), and an outer surface (Gaussian fit 520).

According to an embodiment, mixture modelling such as Multivariate Gaussian mixture modelling offers several advantages over heuristic thresholds. For example, referring to FIG. 5, a threshold approach might expect the chewing surface to comprise brushing angles between −15 and 15 degrees. However, Multivariate Gaussian mixture modelling reveals that the chewing surface is the third Gaussian fit 530 with brushing angles between approximately 5 and 45 degrees. Accordingly, simply using a threshold of −15 to 15 would fail to capture a significant amount of the data related to the chewing surface.

Additionally, mixture modelling such as Multivariate Gaussian mixture modelling allows for variations between brushing sessions, such as variations in the user's technique, variations in the orientation of the user's head, and many other types of variations. For example, if the user is tilting her head while brushing, the extracted clusters or stable orientations could be significantly outside the expected brushing angles for the inner, outer, and chewing surfaces. Thus, if utilizing a threshold approach, a titled head could have a significant negative impact on the methods described herein. Mixture modelling such as Multivariate Gaussian mixture modelling, or other similar processes can automatically find the optimal threshold guaranteeing scalability over time.

According to an embodiment, the methods described or otherwise envisioned herein are suitable for teeth that have primarily two surfaces, such as front teeth with an inner and outer surface. In this scenario, the mixture modelling would identify and report only two Gaussians. This could potentially be combined with information about the guided brushing session such as, for example, what surfaces were supposed to be brushed during that data collection period, to expect only two Gaussians.

According to an embodiment, a seed value can be utilized or provided in order to initiate or direct the mixture modelling. For example, the seed value can be based on a predetermined or derived threshold, or can be provided from the previous brushing session. Thus, the oral cleaning system effectively learns about actual and expected brushing angles of the particular user and can employ that information to increase efficiency of, and decrease processing time for, the mixture modelling. For example, over one or more brushing sessions the oral cleaning system determines that the cleaning surface brushing angle for stable orientations representing brushing of the upper left portion of the user's mouth is always between 0 and 50 degrees. This information can be utilized in the next mixture modelling to expect a Gaussian in the 25±25 degree range. Alternatively, the information can similarly be utilized when the data is fit using thresholds instead of mixture modelling.

In addition to mixture modelling, many other methods can be utilized to fit the extracted one or more stable orientations of the oral cleaning device to one or more expected orientations. For example, clustering techniques will work to fit the one or more stable orientations. As another example, two-dimensional or three-dimensional principal component analysis could also be utilized to fit the extracted one or more stable orientations of the oral cleaning device to one or more expected orientations.

At step 360 of the method, the system provides feedback to the user about the cleaning session based on an analysis of the fitted one or more stable orientations. Based on the calculated data, the system can determine the amount of time that the user spent brushing each region and/or sub-segment. For example, by integrating the histogram data under fit data such as the Gaussians in FIG. 5, the system can determine how much time was spent brushing the inner, chewing, and outer surfaces of that area of the mouth.

The system can also produce probabilities regarding whether a specific data point belongs to a specific teeth surface. Additionally, temporal information can be added to rank or weight probabilities, as a user will likely not move from an inner teeth surface to an outer teeth surface without brushing the chewing surface. Similarly, the user is not expected to move from one extreme surface to another.

The system can also re-run a statistical fitting if the mixing coefficient of the mixture modelling is too high, indicating not enough separability between the data. In such a case, according to an embodiment, the mixture modelling would be re-run using two target Gaussians instead of three, implying a reduced feedback including this time: inner and chewing versus outer and chewing.

According to another embodiment, the system can also deduce the true brushing angle information and can thus report on brushing efficacy. For example, referring to FIG. 5, the mean angle values for each of the Gaussians is −70 degrees for the inner surface (Gaussian fit 510), 22 degrees for the chewing surface (Gaussian fit 530), and 69 degrees for the outer surface (Gaussian fit 520). If Gaussian fit 530 is reset to 0 degrees for the true brushing angle, then the true brushing angle for Gaussian fit 510 (the inner brushing angle) is 92 degrees, and the true brushing angle for Gaussian fit 520 (the outer brushing angle) is 47 degrees. Knowing that brushing efficacy is related to the brushing angle, this information and any derivative of it such as efficacy asymmetry, an efficacy map, or other information can be fed back to a computer program or to a user via any form of feedback.

The feedback generated by the system can be provided to the user in any of a variety of different ways, including via visual, written, audible, haptic, or other types of feedback. For example, the feedback and be utilized to build a coverage map which can be provided to the user and/or further interpreted by a computer program. The coverage map may also be provided to the oral cleaning device to allow it to adapt its internal brushing routine when a user brushes in a specific segment during a future session.

Figure 6:
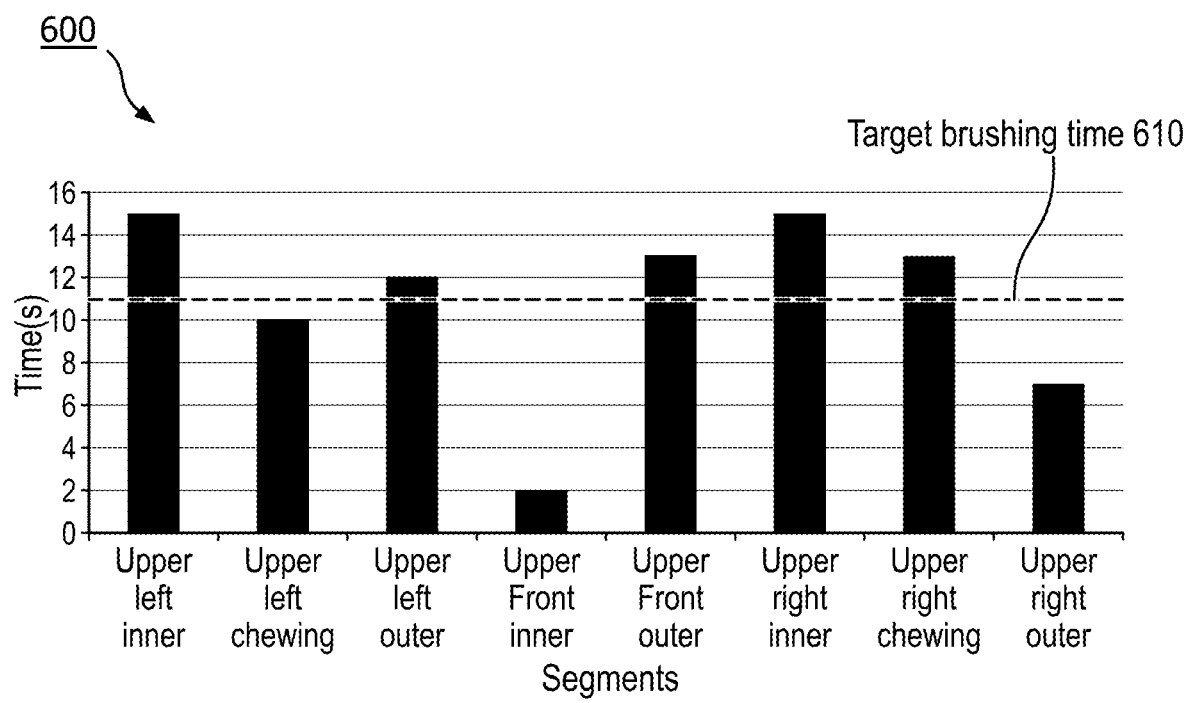
FIG. 6 is a graph of brushing time feedback provided to a user in accordance with an embodiment.

Referring to FIG. 6, in one embodiment, is an example of feedback generated by the system and provided to the user. The system is able to integrate the data contained within fit stable orientations, such as the Gaussians described herein, and can thus determine how much time was spent by the user on specific segments. In the graph 600 in FIG. 6, for example, the amount of time spent brushing specific segments in the upper portion of the user's mouth is displayed along with a target brushing time 610. In this example, the user sees that additional time should be spent on the upper left chewing surface, the upper front inner surface, and the upper right outer surface. In an even more advanced feedback mechanism, the user could receive feedback about individual teeth within a region.

Figure 7:
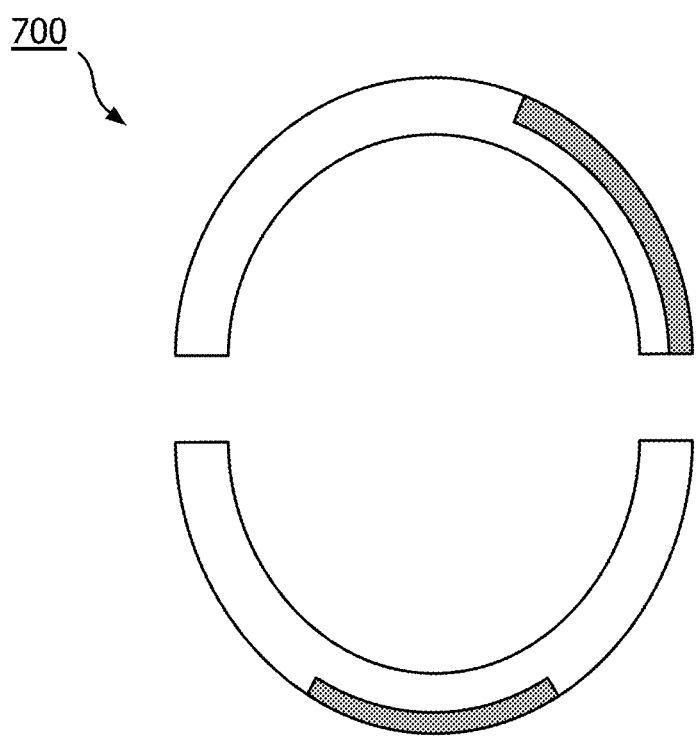
FIG. 7 is a display of brushing efficacy feedback provided to a user in accordance with an embodiment.

For example, the system can communicate information to the user about which regions were adequately brushed and which regions were not adequately brushed utilizing a display, such as a display with eight or twelve target regions and a visual indicator of which regions were adequately brushed, which regions were not adequately brushed, and/or both. Referring to FIG. 7, in one embodiment, is an example of feedback generated by the system and provided to the user. The system is able to determine the brushing angles for the various surfaces and thus can evaluate and provide feedback to the user about brushing efficacy for these areas via a feedback mechanism such as an efficacy map 700. In this efficacy map, the user is shown that the lower front outer surfaces and the upper left outer surface were not adequately brushing during the previous brushing session.

According to an embodiment, the system can provide real-time feedback data to a user or to a remote system. For example, the system can transmit real-time feedback data to a computer via a wired or wireless network connection. As another example, the system can transmit stored feedback data to a computer via a wired or wireless network connection. In addition to these feedback mechanisms, many other mechanisms are possible. For example, the feedback can combine brushing time and efficacy into a display, report, or even a single value, among other types of feedback.

At optional step 370 of the method, the system determines who was likely using the brush during the brushing session. The system can then optionally associate the information with a user and/or user account. For example, according to an embodiment, the system uses the observed brushing angles for one or more surfaces to determine who was using the brush during the brushing session. It can be reasonably assumed that most users will brush their teeth in identical or similar patterns during brushing sessions. Accordingly, once observed brushing angles for one or more surfaces are associated with a particular user and/or user account, subsequent brushing sessions that are sufficiently close to the stored or associated angles or pattern can be assigned to that user. The determination of whether a session is sufficiently close to a prior session may be determined by a threshold or a probability determination, for example. According to an embodiment, the user determination can be utilized for feedback personalized or customized for that user.

At optional step 380 of the method, the evaluation of one or more brushing sessions can be communicated directly to a healthcare professional such as a dentist or dental hygienist. For example, information about one or more brushing sessions can be stored and transmitted to a healthcare professional automatically or upon request. According to an embodiment, device 40 is a smartphone that the patient brings to his dentist's office during a visit, where the information is automatically uploaded via a Bluetooth connection. The dentist can then review the feedback and utilize that information during care.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for providing feedback to a user of an oral cleaning device, the method comprising the steps of:
    receiving, from a sensor, data about a plurality of orientations of the oral cleaning device within the user's mouth during a cleaning session;
    extracting, from the data, information about one or more stable orientations of the oral cleaning device within the user's mouth during the cleaning session, wherein a stable orientation is an orientation of the oral cleaning device maintained by the user for a period of time above a threshold;
    fitting the information about the one or more stable orientations of the oral cleaning device to one or more expected orientations by clustering the one or more stable orientations of the oral cleaning device thereby forming clusters and comparing the clusters to the one or more expected orientations; and
    providing the feedback to the user about the cleaning session based on an analysis of the one or more stable orientations.

2. The method of claim 1, wherein the step of clustering the one or more stable orientations comprises a multivariate Gaussian mixture model.

3. The method of claim 1, wherein said threshold is a predetermined threshold or is statistically derived.

4. The method of claim 1, wherein said feedback comprises information about an amount of time the user spent cleaning each of one or more of a plurality of surfaces within the user's mouth.

5. The method of claim 1, further comprising directing the user to begin the cleaning session with the oral cleaning device at a specific location within the user's mouth.

6. The method of claim 1, wherein said cleaning session is a guided cleaning session.

7. The method of claim 1, wherein the one or more expected orientations are at least an inner tooth surface and an outer tooth surface for each of a plurality of locations within the mouth.

8. An oral cleaning device configured to provide feedback to a user, the oral cleaning device comprising:
    a sensor;
    a feedback component; and
    a controller in communication with the sensor and the feedback component, wherein the controller is configured to: receive, from the sensor, data about a plurality of orientations of the oral cleaning device within the user's mouth during a cleaning session; extract, from the data, information about one or more stable orientations of the oral cleaning device within the user's mouth during the cleaning session; fit the information about the one or more stable orientations of the oral cleaning device to one or more expected orientations by clustering the one or more stable orientations of the oral cleaning device thereby forming clusters and comparing the clusters to the one or more expected orientations; and provide, via the feedback component, the feedback to the user about the cleaning session based on an analysis of the one or more stable orientations.

9. The oral cleaning device of claim 8, wherein the sensor is one or more of a gyroscope, an accelerometer, and a magnetometer.

10. The oral cleaning device of claim 8, wherein the controller is configured to fit each of the one or more stable orientations of the oral cleaning device to an expected orientation by: identifying a mixture distribution in order to cluster the one or more stable orientations of the oral cleaning device and forming the clusters of the one or more stable orientations of the oral cleaning device; and comparing the clusters to the one or more expected orientations.

11. An oral cleaning device of claim 8, wherein the controller is configured to fit each of the one or more stable orientations of the oral cleaning device to an expected orientation using a multivariate Gaussian mixture model.

12. An oral cleaning system configured to provide feedback to a user, the oral cleaning system comprising:
    an oral cleaning device comprising a sensor and a communications module, wherein the oral cleaning device is configured to transmit, via the communications module, sensor data from the sensor about a plurality of orientations of the oral cleaning device within the user's mouth during a cleaning session; and
    a device in communication with the oral cleaning device and comprising a processor, wherein the processor is configured to: extract, from the sensor data, information about one or more stable orientations of the oral cleaning device within the user's mouth during the cleaning session; fit the information about the one or more stable orientations of the oral cleaning device to one or more expected orientations by clustering the one or more stable orientations of the oral cleaning device thereby forming clusters and comparing the clusters to the one or more expected orientations; and provide, via a feedback component, the feedback to the user about the cleaning session based on an analysis of the one or more stable orientations.

13. The oral cleaning system of claim 12, wherein the processor is configured to fit each of the one or more stable orientations of the oral cleaning device to an expected orientation using a multivariate Gaussian mixture model.

14. The oral cleaning system of claim 12, wherein said feedback comprises the information about cleaning efficacy for one or more of a plurality of locations within the user's mouth.

* * * * *